Jan. 2, 1934.  J. MANGIN  1,942,342

GROUND CLAMP

Filed Aug. 4, 1930

Inventor:-
James Mangin
by his Attorneys
Howson & Howson

Patented Jan. 2, 1934

1,942,342

UNITED STATES PATENT OFFICE 1,942,342

GROUND CLAMP

James Mangin, New Brunswick, N. J., assignor to New Brunswick Electric Supply Company, New Brunswick, N. J., a corporation of New Jersey Application August 4, 1930. Serial No. 472,996

2 Claims. (Cl. 247—1)

The present invention relates to ground clamps such as are used in the installation of electric wiring in buildings to ground to a water pipe and the like the lead-in conduit and the conductor or conductors carried thereby and, particularly, relates to improvements in said ground clamps whereby adjustment of the clamp may be made to connect it to a grounding pipe and an electric conduit regardless of the direction of approach of the conduit relative to the grounding pipe.

The principal object of the invention is to provide a ground clamp which may be attached to a water pipe and the like and then positioned to receive an electric conduit which may approach the grounding pipe from any direction relative to the pipe.

A more specific object of the invention is to provide a two-part ground clamp, one part of which may be associated with the other part in different manners to receive a conductor-carrying conduit from any direction relative to the pipe.

A still more specific object is to provide a two-part ground clamp, one part of which has a plurality of extending lugs, each of which may be attached to the other part of the clamp so that a conductor-carrying conduit may be received from any direction.

A further specific object is to provide in a ground clamp a novel connecting lug which is adapted to coact in different manners with any other suitable element having a shank, to thereby ground a conductor approaching a pipe from different directions.

Other objects and advantages will appear more fully hereinafter from the following detailed description taken together with the accompanying drawing, in which.

Figure 1:
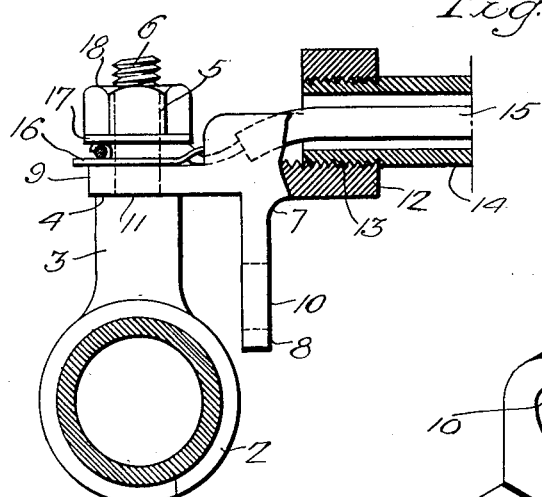
Fig. 1 is an end view of my device attached to a grounding pipe, the conduit-receiving element being shown partly in section.
Figure 3:
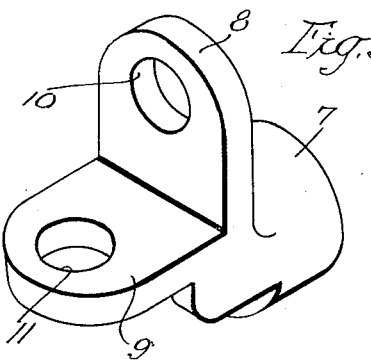
Fig. 3 is a perspective view of the conduit-receiving element of my device.

In my co-pending application, Serial No. 419,598, filed Jan. 9, 1930, I have shown and claimed a universal ground clamp in which the conduit-receiving element may be rotated about the clamping element to receive the conduit from any direction in a given plane. To receive the conduit from a direction lying in a different plane, it is necessary in that device to rotate the clamping element about the grounding pipe or the like. However, it might not be desirable or even possible at times to rotate the clamping element about the pipe. For example, there might be an obstruction to the rotation of the clamping element adjacent the pipe. The device of the present invention is somewhat in the nature of an improvement over that of my co-pending application. In this device, I provide a conduit-receiving element which has a plurality of lugs, each of which may be attached to the clamping element to receive the conduit from different directions without moving the clamping element or disturbing it in any way.

While, in the present instance, I have shown my improved conduit-receiving element associated with a T fitting, it will be apparent that this element may be used with any other suitable attaching or clamping element having a shank to receive the lugs. For example, this conduit-receiving element may be readily used with the rotatable pipe clamping element disclosed in my co-pending application mentioned above.

Referring to the figures of the drawing for a clear understanding of my present invention, there is shown a pipe 1 to which my device is attached. In the present instance, I provide a T fitting 2, which, as is well known, threadedly receives portions of pipe 1 to form a connecting joint therefor. While I prefer to use such a fitting because it forms a very good electrical connection with the pipe, it is obvious that I may use any other suitable element for connecting directly to the pipe. The use of a fitting is particularly advantageous in grounding to water pipes, since there is little corrosion to affect the electrical connection to the pipe. The T fitting 2 is provided with an extending portion 3 which is reduced in diameter at the end thereof to form shank 5. This provides a shoulder 4 on portion 3 around shank 5. The end of the shank is threaded as at 6. While I have disclosed a special form of integral T fitting with an extending shank, I may also use a standard T fitting with a plug having an extending shank screwed into the same.

My improved conduit-receiving element 7 is provided with a pair of extending lugs 8 and 9 having holes 10 and 11 therein respectively. The body portion 12 of this element contains a threaded aperture or passage 13, which is adapted to receive a conduit 14 carrying a conductor 15. In Fig. 1, the conduit-receiving element is shown attached to the T fitting by means of lug 9. Shank 5 receives the lug, as shown, which rests against shoulder 4. The terminal lug 16 of the incoming conductor is then placed over a shank and is held permanently in place by means of washer 17 and nut 18. In this instance, the conduit-carrying conductor approaches the grounding pipe in a horizontal plane from a direction perpendicular of the axis of the plane. It will be noted that the conduit-receiving element may be rotated about shank 5 as a pivot to receive the conductor from any other direction in the particular plane.

Figure 2:
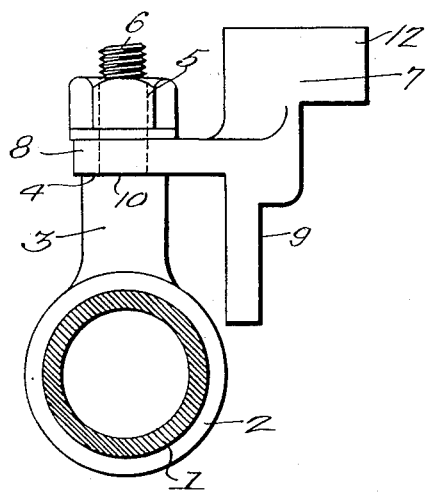
Fig. 2 is an end view of my device attached to a grounding pipe with the conduit-receiving element connected to the clamping element in a different manner from that of Fig. 1.

In Fig. 2, the conduit-receiving element is shown attached to the T fitting by means of lug 8. In this instance, the conductor-carrying conduit approaches the grounding pipe in a vertical plane from a direction perpendicular to the axis of the pipe. Obviously, the conduit-receiving element may be rotated in this case also if desired. If the conductor approaches the pipe from the opposite direction, the receiving element may be inverted so that lug 9 extends upward instead of downward, as shown in Fig. 2. It will be apparent, therefore, that the conductor to be grounded may be attached to the T fitting or any other suitable pipe-connecting means from various directions by means of my improved conduit-receiving element. It is only necessary to either rotate the element about the shank of the connecting element or to attach the receiving element to the connecting element by means of a different lug. Obviously, while I have shown only two lugs on the conduit-receiving element, it may be provided with any number of such lugs within the limits imposed by the co-acting element.

While I have shown a single embodiment of my present invention for the purpose of disclosure and to enable persons skilled in the art to understand the same, it is obvious that many changes may be made in my device without departing from the spirit or scope of my invention. The disclosure is, therefore, not to be taken as limiting my invention in any sense. My invention is to be limited only as required by the prior art as indicated by the scope of the appended claims.

I claim:

1. A grounding device for connecting a conductor of an electric conduit to a grounding pipe, comprising a member attachable to the pipe and having an extending shank, and a conduit-receiving member attachable to said shank, said last member comprising a socket portion for receiving said conduit, and a pair of relatively thin apertured lugs extending from one side of said socket portion at a substantial angle to each other, whereby said lugs may be selectively positioned over said shank and attached thereto without interference with each other or with said conduit.

2. A grounding device for connecting a conductor of an electric conduit to a grounding pipe, comprising a member attachable to the pipe and having an extending shank, and a conduit-receiving member attachable to said shank, said last member comprising a socket portion for receiving said conduit, and a pair of relatively thin apertured lugs extending respectively axially and transversely from one side of said socket portion, whereby said lugs may be selectively positioned over said shank and attached thereto without interference with each other or with said conduit.

JAMES MANGIN.